United States Patent
Hashimoto et al.

(10) Patent No.: US 9,769,991 B2
(45) Date of Patent: Sep. 26, 2017

(54) PLANTING CONTAINER

(75) Inventors: Masaki Hashimoto, Ibaraki (JP);
Hironobu Ota, Nagaokakyo (JP);
Norio Kanayama, Fuchu (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 0 days.

(21) Appl. No.: 12/674,338

(22) PCT Filed: Aug. 19, 2008

(86) PCT No.: PCT/JP2008/064736
§ 371 (c)(1),
(2), (4) Date: May 17, 2010

(87) PCT Pub. No.: WO2009/025268
PCT Pub. Date: Feb. 26, 2009

(65) Prior Publication Data
US 2011/0036008 A1 Feb. 17, 2011

(30) Foreign Application Priority Data

Aug. 21, 2007 (JP) .................................. 2007-214818

(51) Int. Cl.
*A01G 9/02* (2006.01)
(52) U.S. Cl.
CPC ............ *A01G 9/025* (2013.01); *Y02P 60/244* (2015.11)
(58) Field of Classification Search
CPC . A01G 1/00; A01G 9/02; A01G 9/022; A01G 9/023; A01G 9/025; A01G 9/027;
(Continued)

(56) References Cited

U.S. PATENT DOCUMENTS 3,869,829 A * 3/1975 Chiosso ............................ 47/39
4,355,485 A * 10/1982 Frank ................................ 47/82
(Continued)

FOREIGN PATENT DOCUMENTS

| AT | 409980 | * 12/2002 |
| JP | 3-37836 | 1/1991 |
| JP | 6-3050 | 1/1994 |

OTHER PUBLICATIONS

Translation of JP 2003-325052.*
Translation of JP 2006-42775.*
EP0637648 translation.*

*Primary Examiner* — Thien Thanh Pham
(74) *Attorney, Agent, or Firm* — Drinker Biddle & Reath LLP

(57) ABSTRACT

The present invention provides a planting container capable of sufficiently and stably supply planting water to a rhizosphere where roots of a plant grow, securing as large a space as possible for the rhizosphere, and further accelerating the growth of the stem or leaves of the plant. The planting container comprises a planting container body 1 including a planting space 2 having an opening at a front portion thereof to allow a plant to grow, a reservoir 8 for planting water that is provided in a lower part of the planting space 2, and a water-absorbing planting bed placed within the planting space 2 with a bottom portion thereof being positioned in the reservoir 8 for absorbing planting water retained in the reservoir 8 to cultivate the plant, wherein the container further comprises a receiving surface 10 for receiving the planting bed within the planting space 2 formed as an inclined surface that is raised progressively toward the opening and is lowered progressively away from the opening.

14 Claims, 6 Drawing Sheets

(58) Field of Classification Search
CPC ........ A01G 9/028; A01G 9/042; A01G 9/104;
A01G 31/00
USPC .................. 47/79, 82, 83, 85, 62, 65.9, 66.5
See application file for complete search history.

(56) References Cited

U.S. PATENT DOCUMENTS

| | | | | |
|---|---|---|---|---|
| 4,798,499 | A * | 1/1989 | Yamada | E02D 29/025 |
| | | | | 405/262 |
| 5,826,375 | A * | 10/1998 | Black | 47/67 |
| 7,536,829 | B2 * | 5/2009 | Genma et al. | 47/67 |
| 8,341,884 | B2 * | 1/2013 | Rodrigues | 47/86 |
| 2006/0156624 | A1 * | 7/2006 | Roy et al. | 47/62 R |
| 2007/0079553 | A1 * | 4/2007 | Genma et al. | 47/85 |
| 2007/0130828 | A1 * | 6/2007 | Mathy | 47/65.9 |
| 2009/0000189 | A1 * | 1/2009 | Black | 47/82 |
| 2012/0227320 | A1 * | 9/2012 | Dos Santos | 47/79 |

* cited by examiner (a)

| | |
|---|---|
| water-retentive filler under moisture condition (peat moss) (parts by weight) | 100 |
| urethane prepolymer (parts by weight) | 120 |
| polyester-type polyol (parts by weight) | 1 |
| water (parts by weight) | 800 |

(b)

| Million Bells® | subject container used | | comparative container used | |
|---|---|---|---|---|
| total number of sprouting roots | 597 | 598 | 295 | 229 |
| average number of sprouting roots | 597.5 | | 262 | |

| Surfinia® | subject container used | | comparative container used | |
|---|---|---|---|---|
| total number of sprouting roots | 573 | 440 | 166 | 88 |
| average number of sprouting roots | 506.5 | | 127 | |

| Hedera Pittsburgh | subject container used | | comparative container used | |
|---|---|---|---|---|
| total number of sprouting roots | 13 | 22 | 3 | 6 |
| average number of sprouting roots | 17.5 | | 4.5 | |

PLANTING CONTAINER

CROSS REFERENCE TO RELATED APPLICATIONS

This application is the National Stage of International Application No. PCT/JP2008/064736, filed Aug. 19, 2008, and claims benefit of Japanese Application No. 2007-214818, filed Aug. 21, 2007, both of which are herein incorporated by reference in their entirety.

TECHNICAL FIELD

The present invention relates to a planting container comprising a planting container body including a planting space having an opening at a front portion thereof to allow a plant to grow, a reservoir for planting water provided in a lower part of the planting space, and a water-absorbing planting bed placed within the planting space with a bottom portion thereof being positioned in the reservoir for absorbing planting water retained in the reservoir to cultivate the plant.

BACKGROUND ART

An example of such a planting container typically comprises, as shown in FIG. 3(b), a planting space 2 defined by a bottom wall 3 arranged generally horizontally and side walls 4 and 5 extending upward from the bottom wall 3 and having an opening at a front portion thereof to allow a plant to grow, a front wall 7 provided in the front portion of the planting space 2, and a reservoir 8 provided in a lower part of the planting space 2 for retaining planting water W.

With such a planting container, a water-absorbing planting bed A is placed on the generally horizontal bottom wall 3 in which planting water W retained in the reservoir 8 is absorbed by the planting bed A to cultivate a plant P.

DISCLOSURE OF THE INVENTION

In the planting container shown in FIG. 3(b), however, the planting bed A is placed on the generally horizontal bottom wall 3, which forces a lower portion of the planting bed A to be immersed entirely in planting water W at a predetermined level. As a result, a problem arises that a rhizosphere for allowing the growth of roots R of the plant P is reduced.

More particularly, the plant P requires planting water W while the roots R of the plant P respire. Thus, the rhizosphere has an area that is not immersed in planting water W, which disadvantageously results in a reduced rhizosphere for the size of the planting bed A.

In order to secure a large rhizosphere avoiding the above-noted problem, it is considered to provide a shallow reservoir 8 to lower the level of planting water W. However, when the level of the planting water W is lowered, water supply to the planting bed A becomes unstable or, in an extreme case, insufficient even with a slight variance of the water level, as a result of which the plant P may easily die.

In addition, a stem or leaves of the plant P generally has a nature of growing upward. Since a planting plane "a" that defines a front surface of the planting bed A tends to form a vertical plane, a heavy load is applied on the stem or leaves growing from the planting plane "a", which does not exert a favorable influence upon the growth of the plant P.

The present invention has been made having regard to the above-noted problem, and its object is to provide a planting container capable of securing as large a space as possible for the rhizosphere while supplying planting water sufficiently and stably to the rhizosphere for allowing the growth of the roots of the plant, and further capable of accelerating the growth of the stem or leaves of the plant.

A first characteristic feature of the present invention lies in a planting container comprising a planting container body including a planting space having an opening at a front portion thereof to allow a plant to grow, a reservoir for planting water that is provided in a lower part of the planting space, and a water-absorbing planting bed placed within the planting space with a bottom portion thereof being positioned in the reservoir for absorbing planting water retained in the reservoir to cultivate the plant, wherein the container further comprises a receiving surface for receiving the planting bed within the planting space formed as an inclined surface that is raised progressively toward the opening and is lowered progressively away from the opening.

With the first characteristic feature of the present invention, a receiving surface for receiving the planting bed within the planting space is formed as an inclined surface that is raised progressively toward the opening and is lowered progressively away from the opening. As described in more detail later in reference to the drawings, when the water-absorbing planting bed is placed on the receiving surface within the planting space with planting water being retained in the reservoir provided in the lower part of the planting space, the water-absorbing planting bed is deeply immersed in planting water at the side away from the opening while immersed a little or not immersed in planting water at the side close to the opening.

Thus, part of the lower portion of the planting bed that is away from the opening is deeply immersed in planting water while the remaining portion of the planting bed is shallowly immersed or not immersed in planting water, as a result of which a larger rhizosphere for allowing the growth of the roots of the plant can be secured for the size of the planting bed, and planting water is stably and securely supplied to the planting bed from the portion that is immersed in planting water.

Further, since the planting plane defining the front surface of the planting bed is formed as an inclined surface upward, a load applied to the stem or leaves of the plant is reduced to accelerate the growth of the plant.

Moreover, according to the planting container shown in FIG. 3(b), when the planting plane "a" defining the front surface of the planting bed A contacts the front wall 7, an upper edge of the front wall 7 is brought into tight-contact with the planting bed A without allowing any gap therebetween, and planting water W disadvantageously drips outside along the front wall 7.

On the other hand, as shown in FIG. 3(a), the present invention provides the arrangement in which a gap is defined between the planting plane "a" and the upper edge of the front wall 7, which prevents planting water W from dripping outside.

A second characteristic feature of the present invention lies in that the receiving surface is defined by a bottom wall of the reservoir.

With the second characteristic feature of the present invention, since the receiving surface for receiving the planting bed is defined by the bottom wall of the reservoir, it is expected that the above-noted remarkable effects can be achieved with the simple arrangement with the bottom of the reservoir being inclined.

A third characteristic feature of the present invention lies in that the receiving surface is formed by a plurality of receiving surface forming elements projecting upward from the bottom wall of the reservoir.

With the third characteristic feature of the present invention, since the receiving surface for receiving the planting bed is formed by a plurality of receiving surface forming elements projecting upward from the bottom wall of the reservoir, it is possible to make the bottom wall of the reservoir generally horizontal, for example. It is expected that the above-noted remarkable effects can be achieved only by providing the receiving surface forming elements formed integrally with or separately from the bottom wall.

In the case of the surface receiving forming elements formed separately from the bottom wall, it is also possible to desirably select the tilt angle of the receiving surface of the planting bed by providing plural types of the receiving surfacing forming elements depending on the properties of the plant to be cultivated.

A fourth characteristic feature of the present invention lies in that an overflow outlet is provided to communicate with the reservoir for maintaining a level of planting water retained in the reservoir constant.

With the fourth characteristic feature of the present invention, since an overflow outlet is provided to communicate with the reservoir for maintaining a level of planting water retained in the reservoir constant, it becomes easy to maintain the level of planting water retained in the reservoir constant. Thus, the above-noted effects are expected more reliably.

A fifth characteristic feature of the present invention lies in that a plurality of the container bodies are stackable vertically with the openings oriented in the same direction to allow planting water running over the overflow outlet of an upper container body to flow down to a lower container body with the plurality of container bodies being stacked.

With the fifth characteristic feature of the present invention, since a plurality of the container bodies are stackable vertically with the openings oriented in the same direction, it is possible to cultivate the plants with the plurality of container bodies being stacked to a desirable level when the planting container is arranged along a retaining wall, for example.

Further, since planting water running over the overflow outlet of an upper container body is allowed to flow down to a lower container body with the plurality of container bodies being stacked, a predetermined level of planting water is constantly retained in the reservoir of the lowermost planting container, not to mention the uppermost planting container, only if enough planting water is supplied to the reservoir of the uppermost planting container. As a result, it is possible to cultivate the plants satisfactorily in all the container bodies stacked.

BRIEF DESCRIPTION OF THE DRAWINGS

FIG. 6(a) and FIG. 6(b) are tables showing experimental data and experimental results.

BEST MODE FOR CARRYING OUT THE INVENTION

A planting container in accordance with the present invention will be described hereinafter in reference to the accompanying drawings.

Figure 1:
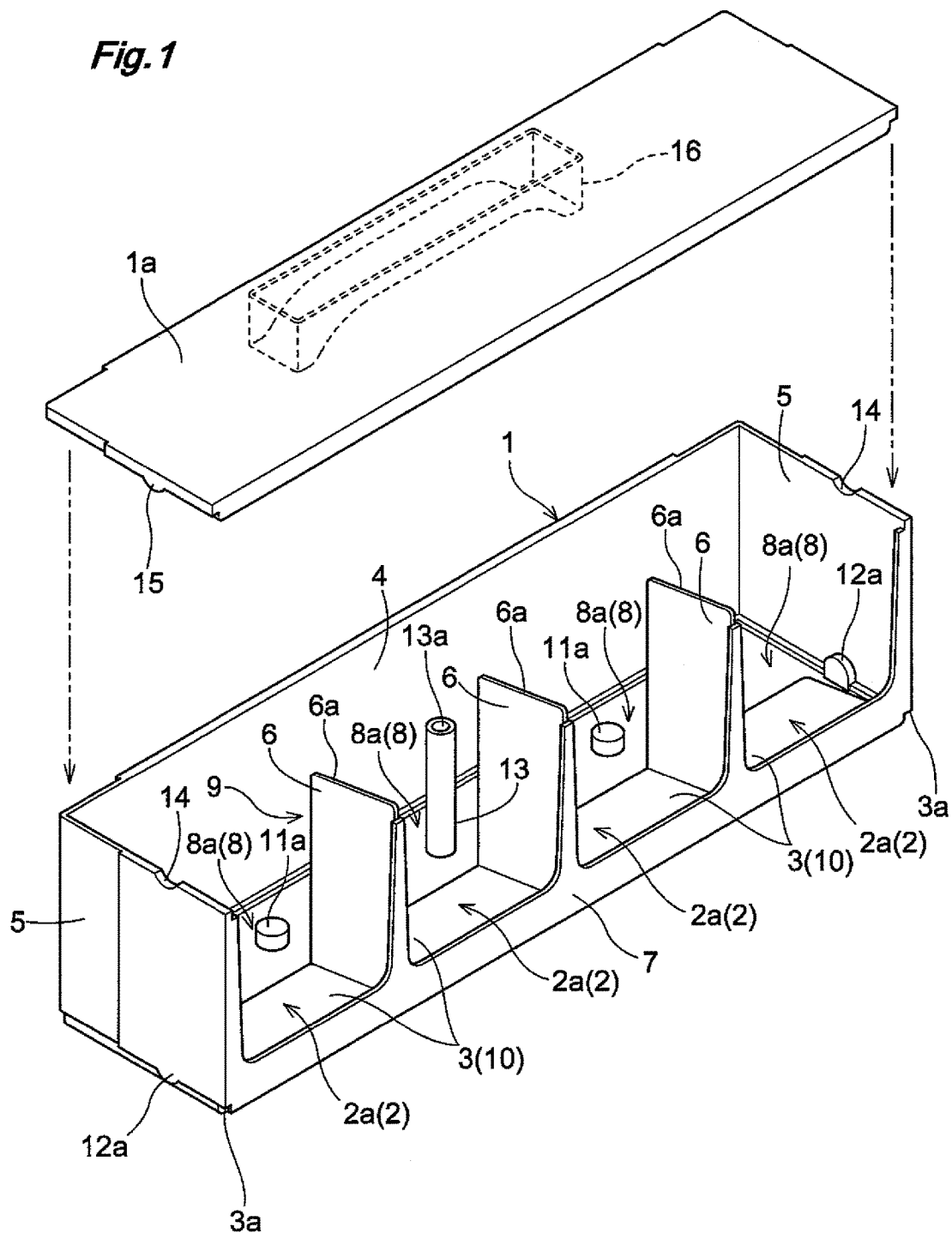
FIG. 1 is an exploded perspective view of a planting container.
Figure 2:
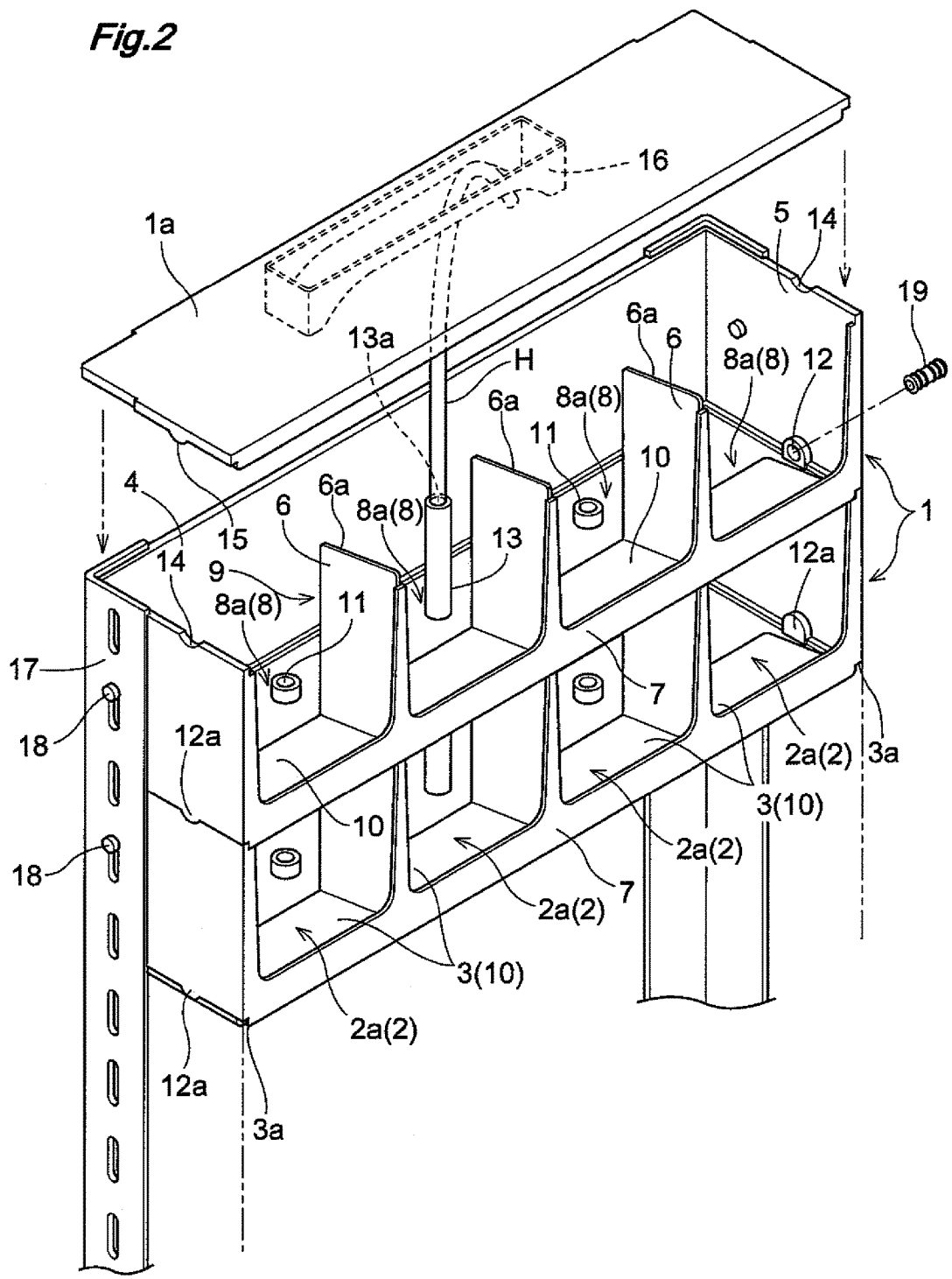
FIG. 2 is a perspective view of the planting containers stacked vertically.
Figure 3:
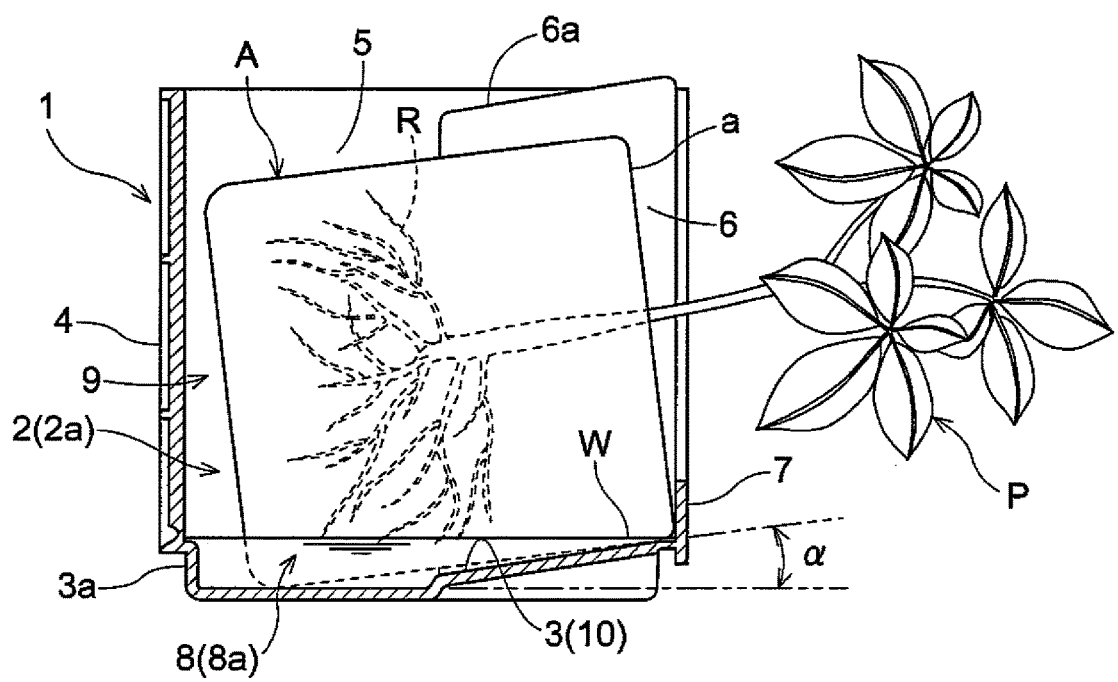
FIG. 3(a) and FIG. 3(b) are cross sections for comparing the effects achieved by the planting containers.
Figure 3:
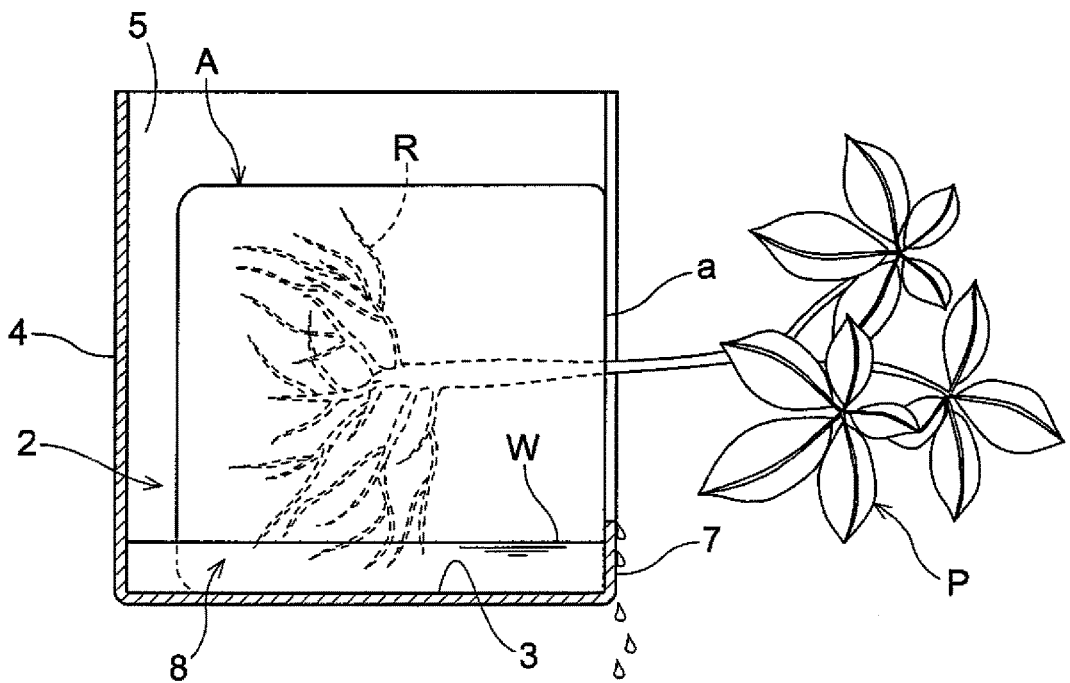

As shown in FIGS. 1 and 2 and FIG. 3(a), the planting container comprises a container body 1 made of synthetic resin, for example, that is elongated in a transverse direction. The container body 1 includes a bottom wall 3, and one longer side wall 4 and two shorter side walls 5 extending upright from three sides of the bottom wall 3, the walls being integrally formed with the container body 1, to form a planting space 2 for cultivating a plant P.

The container body 1 also includes three partition walls 6 extending vertically and formed integrally therewith. The partition walls 6 allow the planting space 2 to be divided into four planting-space units 2a with a lid member 1a being placed on a top of the container body 1. Each of the planting-space units 2a has an opening at a front portion of the container body.

The lid member 1a may be provided as necessary and dispensable.

The container body 1 also includes a front wall 7 having a shorter vertical length and formed integrally with the front portion thereof.

The bottom wall 3, the longer and shorter side walls 4 and 5, the partition walls 6, and the front wall 7 form a reservoir 8 for retaining planting water W.

The reservoir 8 is also divided into four reservoir units 8a by the partition walls 6. Each of the reservoir units 8a is provided in a lower part of each of the planting space units 2a, and a gap defined between the partition walls 6 and the longer side wall 4 serves as a communicating passage 9 for communicating with each of the reservoir units 8a.

A planting bed A made of a water-absorbing material such as a sponge and having any of various shapes such as a cube, a rectangular parallelepiped, or a cylinder is placed on the bottom wall 3 serving as a receiving plane 10 for receiving the planting bed A within each of the planting-space units 2a. The bottom wall 3 of each of the reservoir units 8a, as shown in FIG. 3(a), has an inclined surface forming a tilt angle α so as to be raised progressively toward the opening of each of the planting space units 2a and to be lowered progressively away from the opening of each of the planting space units 2a.

Two cylindrical members 11a project from the bottom wall 3 of the container body 1 and positioned within the reservoir 8 rearwardly of the left and right partition walls 6. A cylindrical member 12a projects from the shorter side wall 5 of the container body 1 to be positioned within the reservoir 8. Each of the cylindrical members 11a projecting from the bottom wall 3 is provided to form an overflow outlet 11 therein for maintaining planting water W retained within the reservoir 8 in a predetermined level or lower. The cylindrical member 12a projecting from the shorter side wall 5 is provided to form a feed-water inlet 12 therein. The cylindrical member 12a for the feed-water inlet 12 is dispensable.

Further, a tubular member 13 having a through bore 13a is provided rearwardly of the partition wall 6 positioned in a center of the container body 1 to be integrally formed with and extend vertically through the bottom wall 3.

Such container bodies 1 may be stackable vertically with the openings for the planting space 2 being oriented to the same direction. To this end, each of the partition walls 6 has an inclined upper edge 6a corresponding to the inclined surface of the bottom wall 3. The bottom wall 3 includes fitting step portions 3a in peripheries thereof while the shorter side wall 5 includes a recess 14 at an upper edge thereof into which the cylindrical member 12a is fitted. More particularly, as shown in FIG. 2, when the container bodies 1 are stacked vertically, the bottom surface of the bottom wall 3 of the upper container body 1 comes in contact with the inclined upper edge 6a of the partition wall 6 of the lower container body 1 while the step portion 3a of the bottom wall 3 of the upper container body 1 is fitted into a top opening of the lower container body 1 and the cylindrical member 12a is fitted into the recess 14.

The lid member 1a is desirably placed on the top opening of the uppermost container body 1. To this end, the lid member 1a has a projection 15 to be fitted into the recess 14 of the shorter side wall 5, and a guide member 16 for a hose.

Next, the use of the planting container will be described hereinafter.

It is possible to use only one container body 1 or only one unit consisting of one container body 1 and one lid member 1a for planting. On the other hand, it is usual in planting to use a plurality of the container bodies 1 that are stacked vertically.

More particularly, as shown in FIG. 2, the plurality of container bodies 1 are stacked vertically and the lid member 1a is placed on the top opening of the uppermost container body 1 as necessary. The cylindrical members 11a of the container bodies 1 except the lowermost container body are perforated to form the overflow outlets 11, and the planting bed A on the market is accommodated in each of the planting-space units 2a for cultivating the plant P.

In that case, angled members 17 may be provided in corners of the vertically stacked container bodies 1 to connect the container bodies 1 to the angled members 17 through suitable connecting elements 18.

Planting water W may be supplied from the front openings of the planting space 2. Otherwise, as shown in FIG. 2, it is also possible to supply water from a feed-water hose connected through a hose connecting element 19 to the feed-water inlet 12 formed by perforating the cylindrical member 12a of the uppermost container body 1.

In the latter case, planting water W is first supplied to the reservoir unit 8a provided in the lower part of the rightmost planting space unit 2a, and then successively supplied through the communicating passage 9 to the four reservoir units 8a arranged in the transverse direction. When planting water W reaches the predetermined level from the bottom wall 3, it overflows from the overflow outlets 11 and flows down to the reservoir 8 of the lower container body 1 and continues to flow down to be eventually supplied to all the reservoir units 8a.

When necessary, a planting-water pumping hose H may be inserted into the through bore 13a formed in the tubular member 13 to have an upper end opening directed downward by the guide member 16. Planting water W retained in a tank (not shown) provided below the lowermost container body 1 is pumped through the hose H by an unillustrated pump to the reservoir 8 of the uppermost container body 1 for circulation.

As noted above, the planting bed A is placed in the container body with the lower part thereof being immersed with planting water W retained within the reservoir unit 8a, and thus supplies planting water W to the roots R of the plant P while absorbing planting water W.

Since the bottom wall 3 serving as the receiving plane 10 for receiving the planting bed A is formed as the inclined surface forming the tilt angle $\alpha$ so as to be raised progressively toward the opening of each of the planting space units 2a and to be lowered progressively away from the opening of each of the planting space units 2a, the part of the planting bed A that is positioned away from the opening is immersed in planting water W while the part of the planting bed A that is positioned close to the opening is a little immersed or not immersed at all in some cases in planting water W, as shown in FIG. 3(a).

Hence, it is possible to secure a large rhizosphere for growth of the roots R of the plant and to supply a sufficient amount of planting water W to the rhizosphere thereby to guarantee the satisfactory growth of the plant.

In order to confirm the above-noted effects achieved by the present invention, comparative experiments were performed for observing growing conditions of plants using the planting container of the present invention shown in FIG. 3(a) (referred to as a "subject container" hereinafter) and the planting container shown in FIG. 3(b) (referred to as a "comparative container" hereinafter). Experimental results will be described below.

In the subject container used in the experiments, the height of the overflow outlet was 14 mm, the tilt angle $\alpha$ of the receiving plane for the planting bed was 14 degrees, and the amount of planting water retained in the reservoir was 155 ml by actual measurement. In the comparative container as used, the height of the overflow outlet was 13 mm, the tilt angle $\alpha$ of the receiving plane for the planting bed is zero, and the amount of planting water retained in the reservoir was 160 ml by actual measurement.

The planting bed used in the experiments contains a water-retentive filler (peat moss), urethane prepolymer, polyester-type polyol, and water in the mixing proportion shown in FIG. 6(a).

The plants used in the experiments were Million Bells® (color: yellow/Solanaceous *Calibrachoa* species/registered trademark of Suntory Flowers Inc.), Surfinia® (color: white/Solanaceous *Petunia* species/registered trademark of Suntory Flowers Inc.), and Hedera Pittsburgh. Seedlings of those three plants were planted in the planting beds of Size 3, cultivated for a month in normal conditions, and transferred to the planting beds of Size 4. Then, the transferred seedlings are placed in each of the subject container and the comparative container by twos, water was supplied twice a day, and the number of roots sprouting on the surfaces of the planting beds was measured three weeks later.

The results are shown in FIG. 6(b), from which it is observed that an average number of sprouting roots where the subject container is used is 2.28 times in the case of Million Bells®, 3.99 times in the case of Surfinia®, and 3.89 times in the case of Hedera Pittsburgh as many as an average number of sprouting roots where the competitive container is used. Here, satisfactory growth of the plants can be confirmed.

Modified Embodiments

Next, modified embodiments of the planting container of the present invention will be described. In order to avoid repetitious descriptions, like reference numbers are assigned to like components that are referred to in the foregoing embodiment and to the components having the like functions to omit any detailed description. Primarily, only the arrangements which differ from the foregoing embodiment will be described.

Figure 4:
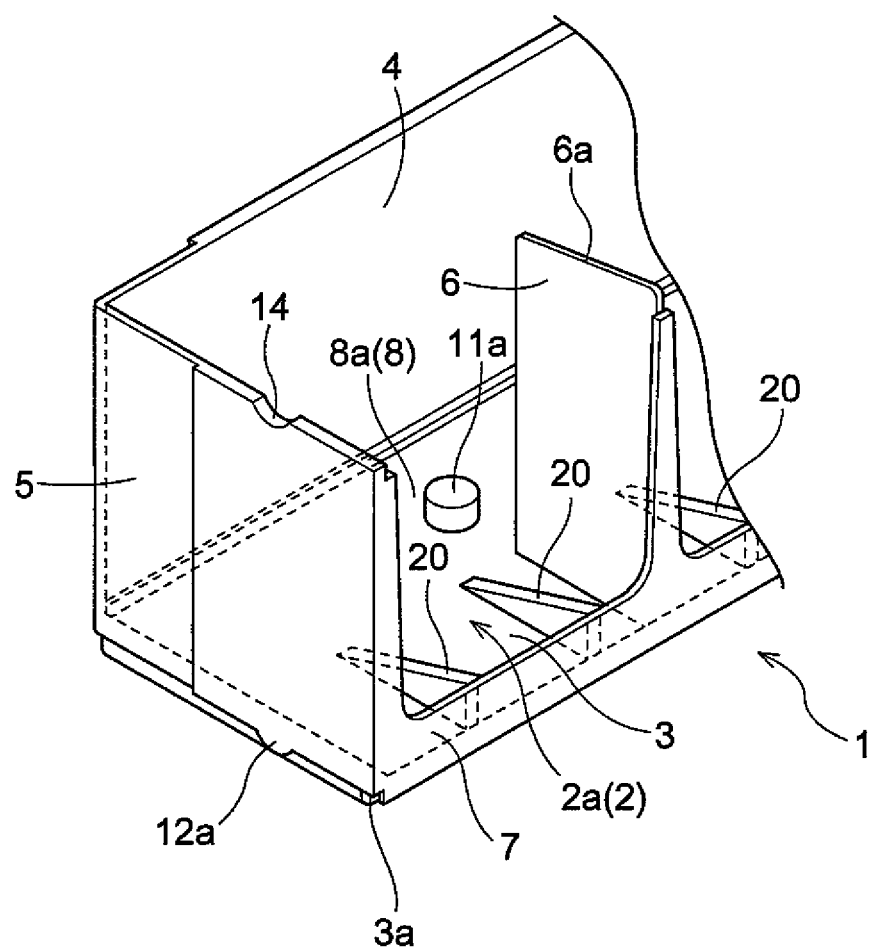
FIG. 4 is a partial perspective view of the planting container in an alternative embodiment.

(1) In the foregoing embodiment, the receiving surface 10 for receiving the planting bed A is formed by the bottom wall 3 of the reservoir 8. Instead, as shown in FIG. 4, a plurality of inclined ribs 20 may be provided to form receiving surfaces extending upward from the bottom wall 3 of the reservoir 8 so that the receiving surface 10 for receiving the planting bed A may have an inclined surface forming the tilt angle α so as to be raised progressively toward the opening of each of the planting space units 2a and to be lowered progressively away from the opening of each of the planting space units 2a. In that case, the plurality of ribs 20 may be formed integrally with the bottom wall 3 or may be formed separately from and fixed to the bottom wall 3.

The tilt angle α of the receiving surface 10 of around 14 degrees is generally suitable, though it may be determined properly depending on the level of planting water W retained in the reservoir 8, the size of the planting bed A, and the properties of the plant P. Where the inclined ribs 20 are formed independently of the bottom wall 3, plural types of the inclined ribs 20 having different tilt angles α may be provided in advance for the selective use.

Figure 5:
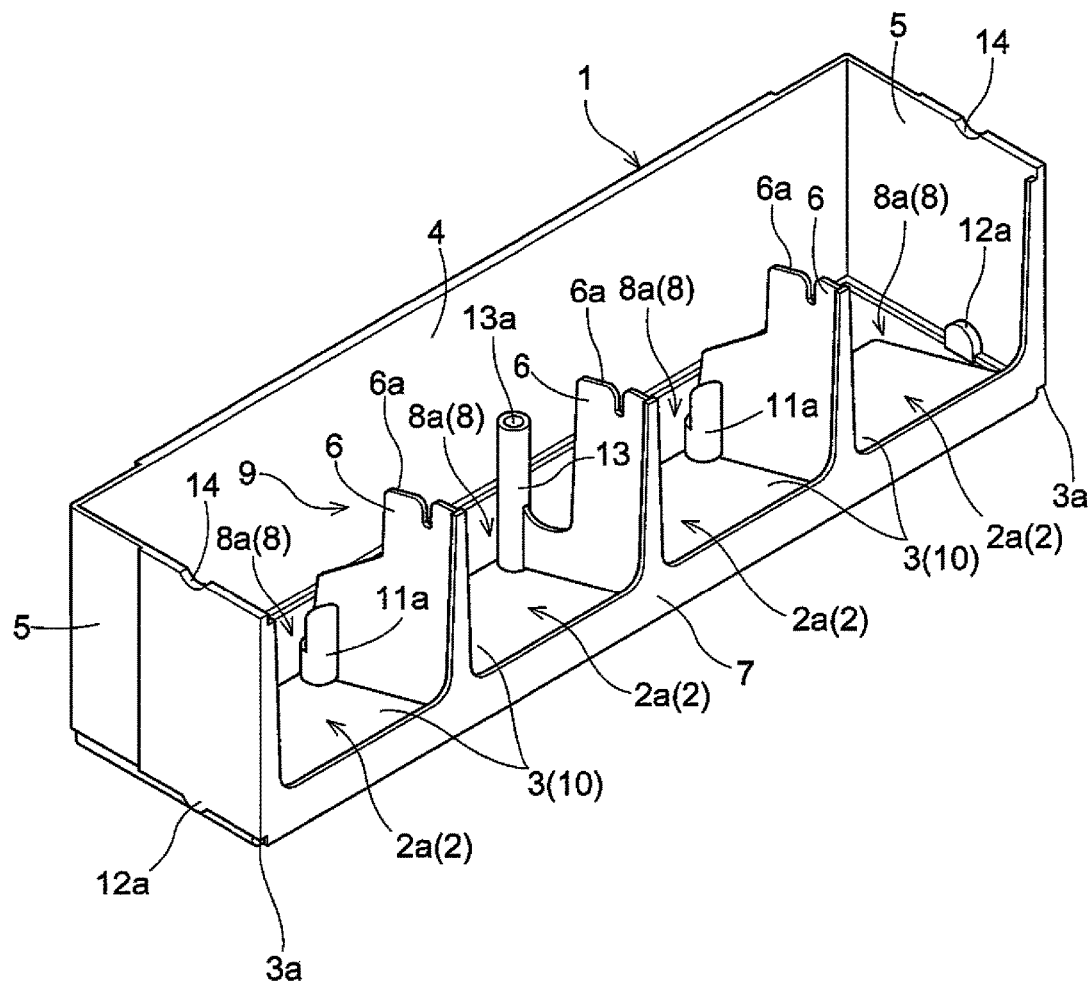
FIG. 5 is a perspective view of the planting container in a further alternative embodiment.

(2) In the foregoing embodiment, the cylindrical member 11a having the overflow outlet 11 and the tubular member 13 having the through bore 13a are separated from the partition wall 6 and provided rearwardly of the partition wall 6. Instead, as shown in FIG. 5, the cylindrical member 11a or the tubular member 13 may be formed integrally with the partition wall 6.

Further, the overflow outlet 11 (not shown) may be formed in the cylindrical member 11a in advance. If the overflow outlet 11 is not necessary, the outlet 11 may be capped.

(3) In all the embodiments mentioned above, the planting space 2 is divided into the planting-space units 2a by the partition walls 6. Instead, it is possible to carry out the invention with a single planting space 2 without dividing the planting space 2 into the planting-space units 2a by the partition walls 6. Further, where the partition wall 6 is provided, the number of the planting-space units 2a is optional, and the planting space may be divided into two or more planting space units 2a.

INDUSTRIAL APPLICABILITY

The present invention is applicable to a planting container comprising a planting container body including a planting space having an opening at a front portion thereof to allow a plant to grow, a reservoir for planting water that is provided in a lower part of the planting space, and a water-absorbing planting bed placed within the planting space with a bottom portion thereof being positioned in the reservoir for absorbing planting water retained in the reservoir to cultivate the plant.

The invention claimed is:

1. A planting container comprising:
   a planting container body including a planting space defined by a square-shaped bottom wall, three side walls extending upwardly from three sides other than a front side of the bottom wall, and a front wall extending upwardly from the front side, the front wall having an opening through which a plant is allowed to grow;
   a reservoir for planting water that is provided in a lower part of the planting space, the reservoir arranged as a part of the planting space, a portion of the reservoir being defined by at least the bottom wall and the front wall, both the reservoir and the planting space accommodating at least a portion of the plant;
   a water-absorbing planting bed placed within the planting space with a bottom portion thereof being positioned in the reservoir for absorbing planting water retained in the reservoir to cultivate the plant;
   a receiving surface for receiving the bottom portion of the planting bed within the planting space, at least a part of the receiving surface formed as an inclined surface that is raised progressively toward the opening in the front wall and is lowered progressively away from the opening in the front wall; and
   an overflow outlet communicating with the reservoir and the planting space for maintaining a level of planting water retained in the reservoir and the planting space constant, the overflow outlet protruding upwardly from the bottom wall of the planting container body into the reservoir and the planting space, such that a portion of the overflow outlet is located inside the reservoir and the planting space and reaches into a part of the planting water that is located inside the reservoir.

2. The planting container as claimed in claim 1, wherein the receiving surface is defined by the bottom wall of the container body.

3. The planting container as claimed in claim 1, wherein the receiving surface is formed by a plurality of receiving surface forming elements projecting upward from the bottom wall of the container body.

4. The planting container as claimed in claim 1, wherein a plurality of the container bodies are stackable vertically with the opening in the front wall of each of the plurality of the container bodies container body oriented in a same direction to allow planting water running over the overflow outlet of an upper container body to flow down to a lower container body with the plurality of container bodies being stacked.

5. The planting container according to claim 1, wherein the container body further includes a partition wall extending vertically for allowing the planting space to be divided into a plurality of planting-space units.

6. The planting container according to claim 5, further comprising:
   a feed water inlet that is arranged centrally inside the planting container body, the feed water inlet formed integrally with the partition wall.

7. The planting container according to claim 6, wherein the feed water inlet and the overflow outlet are separate elements.

8. The planting container according to claim 5, wherein the partition wall extends vertically and the overflow outlet is projecting at a position farther from the front wall than the partition wall is from the front wall.

9. The planting container according to claim 1, wherein an upper circumferential edge of the overflow outlet is arranged in a plane that is parallel to an upper surface of the planting water retained in the reservoir.

10. The planting container according to claim 1, wherein the bottom wall of the planting container body is arranged in a plane that is perpendicular to the side walls of the planting container body at least at a location where the overflow outlet is arranged.

11. The planting container according to claim 1, wherein the portion of the overflow outlet protruding upwardly into the reservoir and located inside the reservoir is exposed to the planting water that is located inside the reservoir.

12. The planting container according to claim 1, wherein the overflow outlet forms a cylindrical tube that protrudes into the reservoir and is located inside the reservoir such that side walls of the overflow outlet are in contact with the planting water inside the reservoir.

13. The planting container according to claim 1, wherein the receiving surface for receiving the planting bed does not protrude outside of the planting container body.

14. The planting container according to claim 1, wherein the reservoir that is formed in the lower part of the planting space is configured such that planting water accumulates on both the front wall of the container body and on the inclined surface of the receiving surface.

* * * * *